Dec. 8, 1959     J. L. TAYLOR     2,916,051
FLUID PRESSURE OPERATED VALVE
Filed March 12, 1958     2 Sheets-Sheet 1
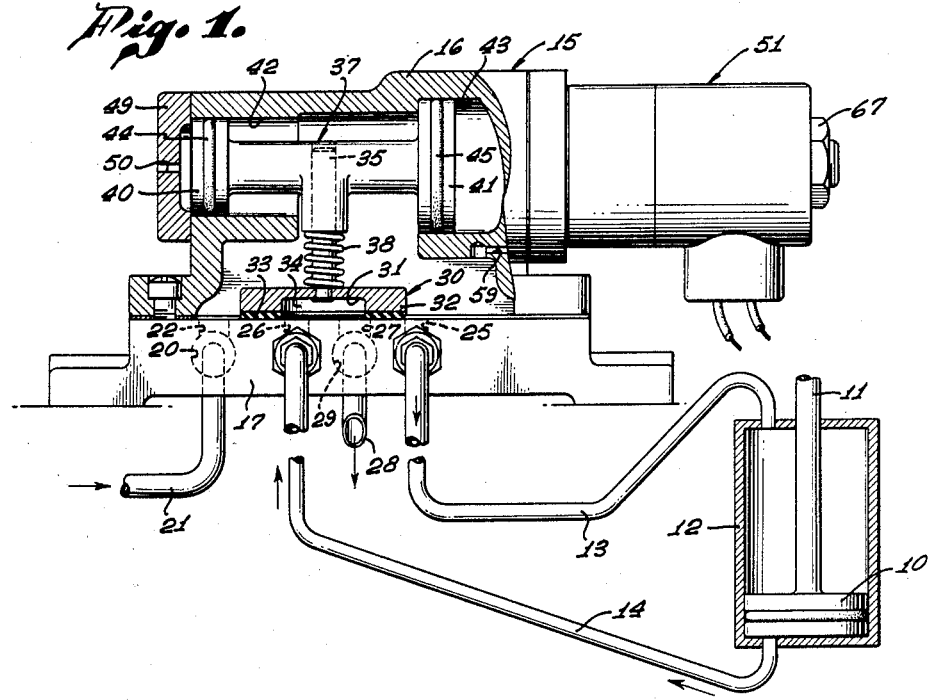
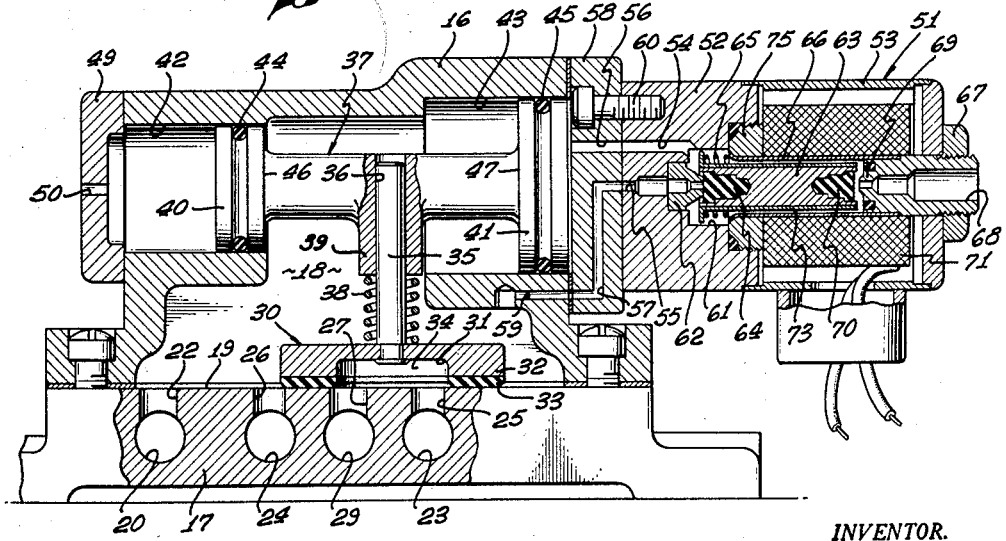
INVENTOR.
JOHN L. TAYLOR,
BY
Flam and Flam
ATTORNEYS.

Dec. 8, 1959    J. L. TAYLOR    2,916,051
FLUID PRESSURE OPERATED VALVE
Filed March 12, 1958    2 Sheets-Sheet 2

INVENTOR.
JOHN L. TAYLOR
BY
Flam and Flam
ATTORNEYS.

United States Patent Office 2,916,051
Patented Dec. 8, 1959

2,916,051

FLUID PRESSURE OPERATED VALVE

John L. Taylor, Chino, Calif.; Elizabeth H. Taylor, administratrix of said John L. Taylor, deceased Application March 12, 1958, Serial No. 720,890

3 Claims. (Cl. 137—623)

This invention relates to a valve structure, and more particularly to a pilot mechanism for selectively positioning a slide valve.

Commonly a slide valve is desirably positioned by the aid of an auxiliary pressure system providing a differential pressure at opposite ends of the slide. For this purpose, opposite ends of the slide form pistons in appropriately located pressure chambers. The slide can be made to move quickly in either direction by pressurizing one of the spaces while exhausting the other. Two separate pilot control members (such as solenoid operated pilot valves), cooperating with the pressure systems respectively associated with the spaces, have been provided.

A single pilot control member has been used to control movement of the slide. For this purpose, a return spring is provided that either overpowers or is overpowered by fluid pressure force acting at one end of the slide. This arrangement, if at all compact, sacrifices quick operation of the valve at least in one direction, since the biasing force of the spring increases as the slide moves against the spring.

It is the primary object of this invention to provide a simple and compact pilot structure for a slide valve or the like utilizing but a single pilot control member in which fast operation of the slide in both directions is achieved.

It is another object of this invention to provide a valve structure of this character utilizing but a single pilot control member in which the use of a biasing spring for the slide is obviated.

It is another object of this invention to provide a valve structure of this general character that has but few parts and that can easily be serviced or repaired.

This application is a continuation in part of my application Serial No. 414,756, filed March 8, 1954, for Fluid Pressure Operated Valve, now abandoned.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view of the valve incorporating the present invention, also showing a selectively positionable mechanism, a portion of the valve being shown in longitudinal section;

Fig. 2 is an enlarged sectional view of the valve shown in Fig. 1, the valve being shown in an opposite position from that shown in Fig. 1.

Figure 3:
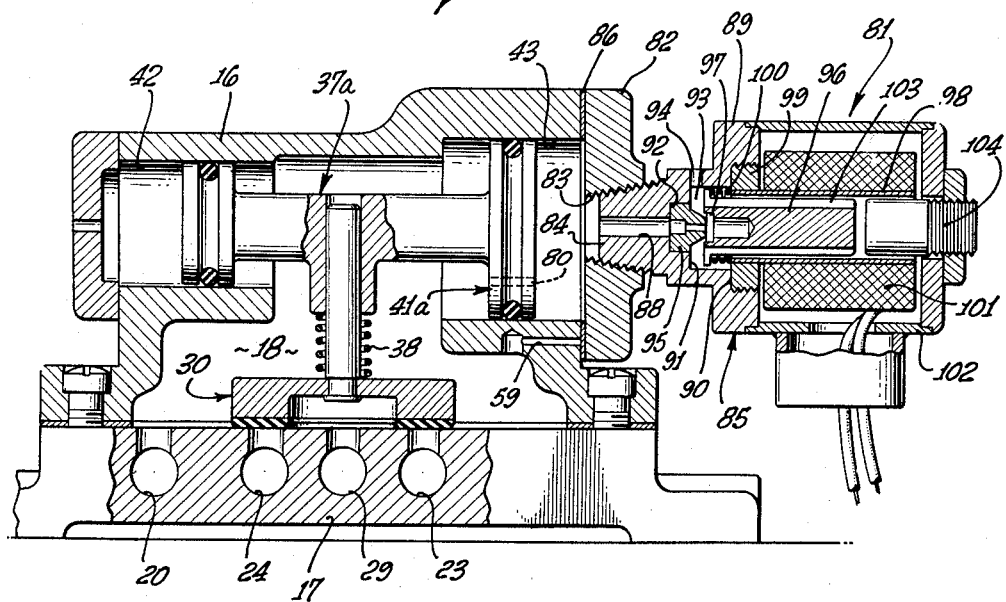
Fig. 3 is a view similar to Fig. 1, illustrating a modified form of this invention.

Referring first to the form of Figs. 1 and 2, a reciprocable piston 10 has a rod 11 adapted to be connected to a movable mechanism intended desirably to be positioned by the piston 10. The piston 10 is slidingly accommodated in a cylinder 12. Motor conduits 13 and 14 respectively communicate with the cylinder 12 on opposite sides of the piston 10.

The valve structure 15 serves as a means to supply air or suitable hydraulic fluid under pressure to either of the conduits 13 or 14 while exhausting the other.

A valve body 16 is secured in place upon a base 17 that covers a cavity of the valve body. A substantially flat surface 19 of the base 17 forms with the walls of the body cavity a valve chamber 18.

Fluid pressure is continuously supplied to the chamber 18 by the aid of a supply conduit 21 cooperating with a lateral opening of a passage 20 formed in the base 17. The passage 20 communicates with the valve chamber 18 through a circular port 22 opening in the inner surface of the base 17.

The base 17 has three spaced ports, each opening at separate locations in the base surface 19. These ports are closely spaced, and the opening of one of them 27 is located substantially midway between the others 25, 26.

The end ports 25, 26 respectively communicate with the motor conduits 13 and 14 via passages 23 and 24 opening laterally on one side of the base 17. The central port 27 communicates with a return conduit 28 via a passage 29 opening laterally on the other side of the base 17.

The surface 19 of the base 17 forms a seat along which a slide valve 30 is movable. This slide valve 30 serves optionally to uncover either motor port 25 or 26 while connecting the other motor port 26 or 25 to the return port 29 for desirably positioning the piston 10.

The slide valve 30 is generally of circular configuration, having a shallow central recess 31 defining a continuous flange 32. A resilient ring 33, made of neoprene or other suitable material, cemented in place upon the end surface of the flange 32, engages the seat 19. The recess 31 of the slide valve 30 forms with the seat 19 that it opposes a valve space 34.

A stem 35 is secured at one end to the slide valve 30 and extends upwardly in a direction normal to the plane of the seat 19. The upper end of the stem 35 is slidingly accommodated in a through transverse bore 36 of a control piston 37. As will be described more fully hereinafter, the control piston 37 is rectilinearly movable in a direction parallel to the seat 19. The slide valve 30, being connected to the control piston 27 for movement in this direction, is correspondingly moved along the seat 19.

A compression spring 38 surrounds the valve stem 35 and engages at opposite ends that surface of the slide valve 30 exposed in the valve chamber 18 and the end surface of a stem guiding boss 39 integrally formed on the control piston 37. The resilient ring 33 is slightly compressed against the seat 19 by the force of the spring 38 and the force due to the fluid pressure in the chamber 18 acting upon the exposed upper surface of the slide valve 30. Accordingly, the slide valve space 34 is effectively sealed and isolated from the valve chamber 18.

The return port 27 continuously communicates with the slide valve space 34. For this purpose, the slide valve 30 has a path of movement centered at the return port 29, and its total extent of movement is less than the operative length of the valve space 34 to ensure continuous communication between the return port 29 and the slide valve space 34.

The motor ports 25 and 26 are so located as to communicate with the slide valve space 34 when the slide valve 30 is in one extreme position and be exposed to the valve chamber when the slide valve 30 is in the other extreme position.

In the position of the slide valve shown in Fig. 2, the piston 37 and the slide valve 30 are in their extreme right-hand end position. The motor port 26, connecting with the motor passageway 14, is uncovered and exposed in the valve chamber 18. Accordingly, the space beneath the movable piston 10 is supplied with fluid under pressure.

In this position of the slide valve 30, the motor port 25 connecting with the other motor passageway 13 communicates with the slide valve space 34 and the return port 29. Accordingly, the movable piston 10 is urged upwardly. Correspondingly, opposite movement of the slide valve 30 causes the movable piston to be urged downwardly.

The resilient ring 33 has a seat contacting area sufficient fully to cover the motor ports 25 and 26 when the slide valve is in an intermediate position. Simultaneous communication of either motor port 25 or 26 with the valve chamber 18 and the slide valve space 34 is impossible and, accordingly, the valve chamber 18 cannot be placed in direct communication with the slide valve space 34.

The control piston 37 has heads 40 and 41 at opposite ends that are of different sizes, the right-hand piston head 41 being larger than the left-hand piston head 40. The heads 40 and 41 are respectively accommodated in cylinder spaces 42 and 43 that are formed by the valve body 16. The piston heads 40 and 41 each carry appropriate resilient O-rings 44 and 45 sealing against the walls of the cylinders 42 and 43 respectively. Corresponding inner ends of the cylinders 42 and 43 are exposed in the valve chamber 18. Accordingly, the inner surfaces 46 and 47 of the respective piston heads 40 and 41 are continuously subjected to the pressure of fluid in the valve chamber 18.

The cylinders 42 and 43 open at opposite ends of the valve body 16. The cylinder space 42 for the small piston head 40 continuously communicates with the ambient air. A protective end cover 49, covering the outer opening of the cylinder 42, and secured to the body 16 as by machine screws (not shown), has a through port 50 continuously establishing communication between the outer end of the cylinder 42 and the ambient atmosphere. The cylinder space for the large piston head 41 is placed in communication either with the ambient atmosphere or the valve chamber 18.

Should the cylinder space for ahe large piston head 41 and to the right thereof be placed in communication with the ambient air, the pressure of the fluid in the valve chamber 18, acting on the inner surfaces 46 and 47 of the piston heads 40 and 41, serves to move the control piston 37 toward the right, since the effective area of the inner surface 47 of the piston head 41 is substantially greater than the area of the inner surface 46 of the small piston head 40.

Should the cylinder space for the large piston head 41 be connected to the valve chamber 18, there is a resultant force on the control piston 37 urging it toward the left. This follows since the forces on the large piston head 41 may be considered as being balanced, while there is a net force on the small piston head 40 urging it toward the left.

Accordingly, by controlling only the pressure conditions in the cylinder space for the large piston 41, the control piston 37 of the slide valve 30 is selectively positioned. By appropriately proportioning the sizes of the respective piston heads 40, 41, the net force for both directions can be made equal so that the operation of the slide valve is essentially symmetrical. The criterion for this, neglecting pressure drops, is that the total area of the large piston head be twice the total area of the small piston head.

For controlling the pressure in the large cylinder space, any three-way pilot valve structure can be provided. In the present instance, a solenoid operated valve structure 51 is shown. The solenoid valve includes a generally cylindrical valve body 52 upon which a shell 53, mounting electromagnet parts, is affixed. The valve body 52 has ports 54 and 55 both opening in one end surface of the cylindrical body 52. These body ports 54 and 55 respectively communicate with ports 56 and 57 formed in an adapter plate 58 that covers the lateral opening of the cylinder space cooperable with the large piston head 41. The adapter plate 58 is secured to body 16, as by machine screws (not shown). One of the ports 56 of the plate 58 opens into the cylinder space, and the other port 57 of the plate 58 communicates with a port 59 opening into the valve chamber 18.

The solenoid valve body 52 is appropriately secured in place upon the plate 58, as by machine screws 60, for registry of the ports 54, 56 and 55, 57. A sleeve 66, in which a plunger 63 is movable, is supported by a fitting 75 for registry with a recess 61 formed in the solenoid valve body 52. The recess 61, together with the sleeve 66, forms a valve chamber into which the ports 54 and 55 of the solenoid valve body 52 open. One of the ports 55 connected to the main valve chamber 18 opens in the bottom of the recess 61. A seat-forming member 62 surrounds the opening of this port. The other port 54 opens laterally into the recess 61.

A plug 67, telescopingly received in the opposite outer end of the sleeve 66, has a through aperture 68 that may establish communication between the sleeve 66 and the atmosphere. A raised seat 69 is formed about the inner end of the aperture.

The plunger 63, carrying sealing members 64 and 70 at opposite ends, is movable for alternately engaging the seats 62 and 69. A compression spring 65, engageable at opposite ends with a flared end of the sleeve 66 and a flange of a plunger part 73, urges the plunger in a direction to seal the pressure port 55 and open the exhaust aperture 68. In this position, the piston space exhausts via ports 56, 54, into recess 61, through the annular clearance space between the plunger 63 and the sleeve 66 and through the plug aperture 68 to the ambient air. The slide valve 30 is thus moved to one position, corresponding to that shown in Fig. 2.

An electromagnet coil 71 mounted upon the sleeve 66, when energized, retracts the plunger 63 to seal the plug aperture 68 and open the pressure port 55. In this position, the piston space communicates with the main valve chamber 18, and the slide valve 30 is moved to the opposite position corresponding to that shown in Fig. 1.

The plug aperture 68 and the cover port 50 are restricted sufficiently to provide a very slight cushioning effect for the control piston 37 as it moves between its limits.

The valve structure is quite simple in structure, only one pilot valve being required. No biasing springs for the control piston 37 are required, and the forces available to move the control piston 37 and the slide valve 30 in opposite directions are equal. There is no diminution in the moving force throughout the stroke of the piston 37, except that due to hydraulic lag, all despite the fact that only a single pilot valve is provided. The slide valve is very quickly responsive to the operation of a switch controlling the solenoid valve 51.

In the form illustrated in Fig. 3, the valve body 16, base 17 and slide valve structure 30 are provided as in the previous form. The valve body 16 provides the two cylinder spaces 42 and 43. Reciprocable in these cylinder spaces is a control piston 37a. The piston 37a is similar to the piston 37 of the previous form, except that the larger head 41a is provided with a restricted passageway 80 opening at opposite sides thereof.

Movement of the control piston 37a is achieved in this instance by selectively venting that portion of the cylinder space 43 on the outer side of the head 41a. When this cylinder space 43 is vented, the control piston 37a moves quickly to the right in the same manner as the control piston 37 described in the previous form. The passageway 80 is restricted sufficiently so that it is incapable of restoring the pressure when the cylinder space 43 is vented. When the vent is closed, the restricted passageway 80 restores the pressure on the outside of the head 41a. The control piston 37a now moves to the left.

For controlling the cylinder space 43, an electromagnetic valve 81 is provided. An adapter or closure plate 82 serves to define a vent opening from the cylinder space 43 and also to support the electromagnetic valve 81. A gasket 86 is interposed between the adapter plate 82 and the end surface 87 of the body 16 about the cylinder space 43. In the present instance, the gasket seals the passage 59 which is not used in the present form.

The adapter plate 82 has a tapered, threaded, central bore 83 which threadedly receives a nipple 84 formed integrally with the body portion 85 of the electromagnetic valve 81. The body 85 of the electromagnetic valve structure 81 has a through passage 88 extending through the nipple 84 and a flange 89 at the opposite end of the body 85. The passage 88 has three successive shoulders 90, 91 and 92. Formed inwardly of the first shoulder 90 is a valve chamber 93 that is vented to the ambient atmosphere by the aid of a transverse port 94. Formed between the second and the third shoulders 91 and 92 is a socket within which a seat insert 95 is accommodated. This seat insert has a through passage surrounded at its right-hand end by a conical seat opening into the valve chamber 93. The opposite end of the passage in the seat insert 95 communicates with that portion of the passage 88 which is located at the nipple 84.

A plunger or armature 96 of magnetic material carries a disk closure 97 at its right-hand end which cooperates with the seat insert 95. The plunger 96 is guided in a sleeve 98 which is secured to the electromagnetic valve body 85. For this purpose, the sleeve 98 is press-fitted at its left-hand end in a through opening of a peripherally threaded member 99. The member 99 is accommodated in the right-hand end of the body passage 88, and it abuts the first shoulder 90 formed therein. The member 99 also projects radially inwardly of the shoulder 90 to form a seat for a compression spring 100 which, at its left-hand end, engages a flange formed on the plunger 96. Accordingly, the plunger 96 is normally urged in a direction such that its closure disk 97 engages the seat insert 95 to close the passage 88.

When the plunger 96 is retracted, the seat insert 95 vents the cylinder space 43 of the control piston 37a, the transverse port 94 now being in communication with the left-hand end of the body passage 88.

For retracting the plunger 96, an electromagnetic coil 101 is provided. The coil 101 is mounted upon the sleeve 98. A casing structure 102 for the electromagnetic coil 101 is carried by the aid of the flange 89.

The plunger 96 has a series of longitudinally extending grooves 103 to ensure against entrapment of air at the inner end of the sleeve 98, whereby the plunger 96 can be quickly moved by the electromagnetic coil 101. An adjustable stop 103, mounted on the electromagnetic valve casing 102, determines the extent of opening movement of the electromagnetic valve.

The inventor claims:

1. In a two-position fluid pressure operated valve structure: a valve body having a chamber; a wall of the chamber having valve ports therein; means for admitting fluid under pressure to the chamber; a slide valve closure movable along the wall and within the chamber for controlling the ports; means for moving said closure, comprising a pair of cylinder structures having a common axis parallel to said surface; said cylinder structures being disposed at opposite sides of the valve body; the cylinders being of unequal size; pistons fitting the cylinders; a stem connecting the pistons; each of the cylinders having inner ends opening into the chamber; means determining opposite limits of movement of the pistons, the pistons being free to move between said limits; the outer end of the smaller cylinder being continuously connected to exhaust; an adapter plate secured to and carried by the body for closing the cylinder for the larger piston; and valve means mounted on said adapter plate and optionally operable to cause the outer end of the larger cylinder to be subjected either to the pressure of the chamber or to exhaust pressure.

2. The combination as set forth in claim 1 together with means forming a passage through the adapter plate and opening at one end into the outer end of the larger cylinder; means forming within the body a restricted passage between said chamber and the outer end of said larger cylinder; the optionally operable means comprising an electromagnetically operable valve having a base provided with a nipple fitted at the opening of said closure means for supporting the base, there being a through opening through the base and nipple registering at the nipple end with said passage of said adapter plate, an armature having provisions for closing said through opening, an electromagnet coil supported on the base for moving the armature from closing position, and resilient means for urging the armature to closing position.

3. In a two-position control valve structure: a valve body having a chamber; a wall of the chamber having valve ports therein; means for admitting fluid under pressure to the chamber; a slide valve closure movable along the wall and within the chamber for controlling the ports; said body having a pair of cylinder spaces of different sizes at opposite portions of the chamber; the larger cylinder space opening in an outer surface of the body; said valve body having a passage also opening in said outer surface and extending to the chamber; pistons in the cylinder spaces; a stem interconnecting the pistons and mounting said slide valve; an adapter plate closing the opening of said larger cylinder space, and having ports respectively registering with said larger cylinder space and said body passage; an electromagnetically operated pilot valve optionally operable to interconnect said adapter plate ports and to close said port registering with said body passage while placing the other adapter plate port in comunication with the exhaust; and means connecting the outer end of said smaller cylinder space to the exhaust; said pistons being free to move between opposite limits in accordance with the position of the pilot valve.

References Cited in the file of this patent
UNITED STATES PATENTS
396,239     Schreuder             Jan. 15, 1889